UNITED STATES PATENT OFFICE.

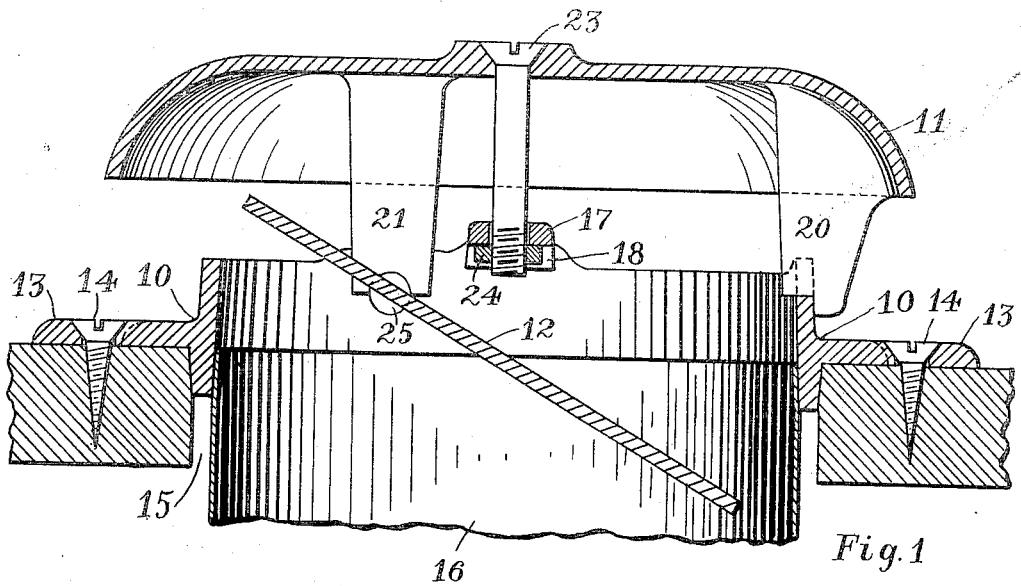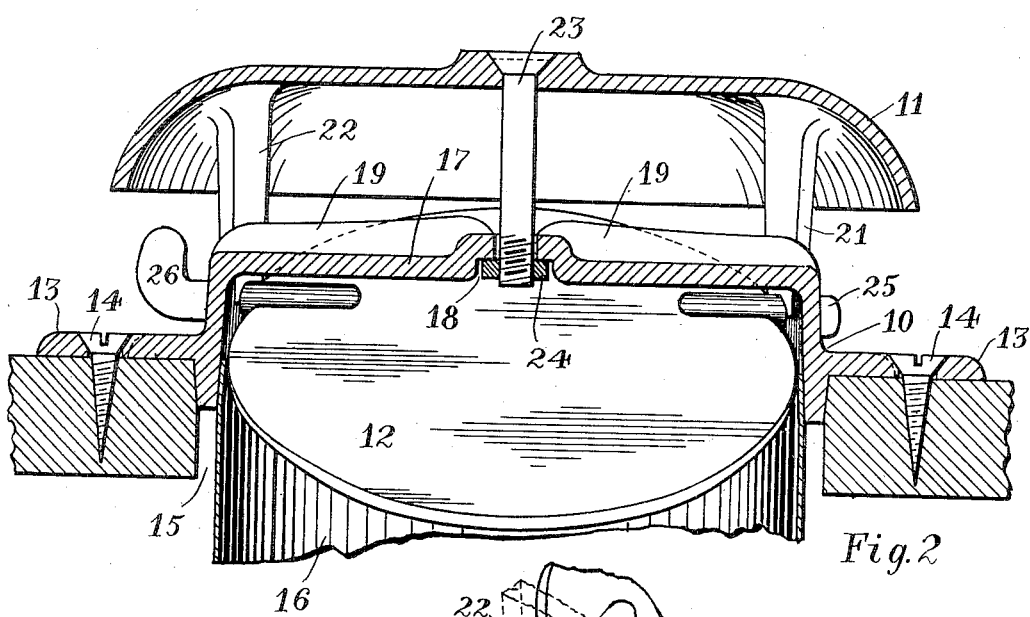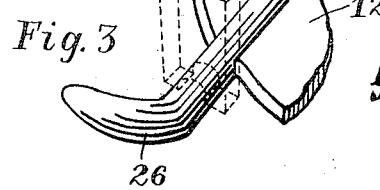

GEORGE E. KNOWLES, OF NEW YORK, N. Y.

VENTILATING-VALVE.

971,047.  Specification of Letters Patent. Patented Sept. 27, 1910.

Application filed February 19, 1910. Serial No. 544,830.

*To all whom it may concern:*

Be it known that I, GEORGE E. KNOWLES, a citizen of the United States, residing in the city and State of New York, have invented a certain new and useful Improvement in Ventilating-Valves, of which the following is a specification.

This invention relates to an improved device which comprises a combined valve and distributing means for use at the outlet of a ventilating passage or duct and more particularly to means of this kind suitable for insertion in floors or walls of theaters, lecture halls, churches and other public buildings wherein free ventilation is desirable.

The principal object of the invention is the provision of a simple reliable and inconspicuous device wherein the volume of air or other fluid to be delivered from the end of a suitable passage or duct may be governed at will by suitable adjustment of a movable valve and wherein any given adjustment may be preserved by locking the movable valve member through suitable adjustment of a fluid distributing member or device associated with said valve.

Certain minor objects and advantages of the invention will be clear to those skilled in the art on perusal of the following specification taken in connection with the drawings.

The invention comprises a movable valve member and a separate associated fluid distributing device (preferably a bell or hood) and means whereby adjustment of the fluid distributing device serves to lock the valve in any desired position. This preferably takes the form shown in the drawings wherein the adjusting movement of the fluid distributing device is so slight as to be scarcely perceptible and wherein the locking of the valve takes place by changes in pressure exerted upon a suitable element connected to the valve. The advantage which follows from this arrangement as contrasted with certain prior devices intended for this general purpose is that the regulation of the volume of air or other fluid by movement of the valve is independent of any material change in position of the fluid distributing device and thus a constant distributing or spreading effect is obtained, whatever the rate of delivery of fluid may be.

A preferred form of my invention is illustrated in the accompanying drawings wherein—

Figure 1 is a median vertical section of the device at right angles to the cross bar, Fig. 2 is a similar section at right angles to the view in Fig. 1 and Fig. 3 is a perspective view of a detail.

In the form illustrated the device is embodied in a single compact article of manufacture easily shipped and comprising broadly three principal parts, namely, a flanged ring 10, a bell or hood 11 acting as a fluid distributing device and a movable valve member 12 pivoted in suitable bearings in the ring 10. The ring 10 is provided with a circular flange 13 whereby it may be secured in place by means of screws 14 or otherwise over an opening 15 in a wall or floor. The ring 10 is adapted to be placed at the exit of a ventilating duct or similar passage, shown at 16, which may enter the ring, as shown, or be otherwise suitably assembled therewith.

Extending diametrically across the ring 10 and preferably cast integral with the ring is provided the cross bar 17 having a perforation through its middle opening into an appropriate cavity 18 beneath the cross bar. Ribs 19 are preferably supplied to strengthen the cross bar.

The fluid distributing device comprises a bell or hood 11 preferably supported by three legs, shown respectively at 20, 21 and 22, and this bell is held in place by suitable means permitting easy adjustment of the pressure transmitted through said legs, which means preferably take the form shown in the drawing comprising a screw or bolt 23 extending down through the center of the bell and into the cavity 18 through the aperture at the middle of the cross bar and a suitable nut 24 fitting within the cavity and prevented from turning by the sides of said cavity. The leg 20 of the bell 11 rests, as shown in Fig. 1, within a suitable recess in the edge of the ring 10 while the two legs 21 and 22 rest respectively upon the two pivots 25 and 26 preferably formed integral with the valve member 12 and forming the supports of the valve member. This is shown particularly in Figs. 1 and 3. To facilitate manual adjustment of the position of the valve 12 I prefer to provide one of the pivots, as 26, with a bent extension forming a sort of crank member. From this description it will be seen that, when it is desired to adjust the valve member 12 to suitably limit the delivery of air or other fluid it is only necessary to turn the screw 23 sufficiently to lessen the frictional effect of the legs 21 and 22 on the pivots 25 and 26, thus freeing the valve. The valve may then be adjusted at will by means of the bent pivot 23 and, while held in the desired position, the screw 23 can be tightened again with a screwdriver, thus causing the ends of the legs 21 and 22 to bear firmly down upon the pivots 25 and 26 and so lock the valve in place. It will be seen that this operation involves only an imperceptible movement of the bell 11 and that the position of the bell is exactly the same in all positions of the valve when locked. The action of the curved undersurface of the bell 11, or equivalent fluid distributing device, is thus kept constant independently of variations in volume of fluid delivered.

This device is particularly useful when located under the seats of theaters where it occupies very small space and exhibits an attractive and symmetrical appearance in so far as it is perceptible at all.

Various changes may be made in the form and embodiment of my device without departing from the scope of the invention, and I do not limit myself to the details herein shown and described.

What I claim is—

1. A device of the character described comprising in combination a movable valve adapted to control the movement of air or other fluid, a fluid distributing device associated with said valve, and means mechanically connected to said fluid distributing device for locking the said valve in any desired position, substantially as described.

2. A device of the character described comprising in combination a movable valve adapted to control the movement of air or other fluid, a fluid distributing device associated with said valve, and means for producing a variable frictional engagement between said fluid distributing device and said valve for locking the latter in any desired position, substantially as described.

3. A device of the character described comprising in combination a movable valve adapted to control the movement of air or other fluid, a pivotal mounting for said valve, a fluid distributing device associated with said valve and having a bearing on said pivotal mounting, and means for varying the pressure of contact between said fluid distributing device and said pivotal mounting, substantially as described.

4. A device of the character described comprising in combination a ring, a valve having a pivotal mounting in said ring, a fluid distributing device having one bearing on said ring and another on said pivotal mounting, and means for varying the pressure of contact between said fluid distributing device and said pivotal mounting, substantially as described.

5. A device of the character described comprising in combination a ring, a valve having two pivots bearing on said ring, a fluid distributing device having one bearing on said ring and two additional bearings resting upon said two pivots respectively, and means for varying the pressure of contact between said fluid distributing device and said pivots, substantially as described.

6. A device of the character described comprising in combination a ring, a cross bar on said ring, a valve having a pivotal mounting in said ring, a fluid distributing device having one bearing on said ring and another on said pivotal mounting, and a screw connection between said fluid distributing device and said cross bar, substantially as described.

7. A device of the character described comprising in combination a flanged ring, a cross bar on said ring provided with a cavity and an aperture near its middle, a valve having two pivots bearing on said ring, a bell having three legs, one of which bears on the edge of said ring while the other two bear respectively on said two pivots, a bolt or screw passing downward through said bell and said aperture in the cross bar and a nut within the cavity in the cross bar threaded onto said bolt or screw, substantially as described.

8. A device of the character described comprising in combination three separate principal members, namely, a ring, a fluid distributing device carried by said ring, and a movable valve member carried by said ring and arranged to make frictional engagement with said fluid distributing device; all in combination with means for varying the degree of frictional engagement between the valve member and the fluid distributing device, substantially as described.

GEORGE E. KNOWLES.

Witnesses:
H. S. MACKAYE,
M. A. BUTLER.